Sept. 4, 1928.
A. PFEIFFER
SURGICAL MOTOR
Filed June 27, 1925
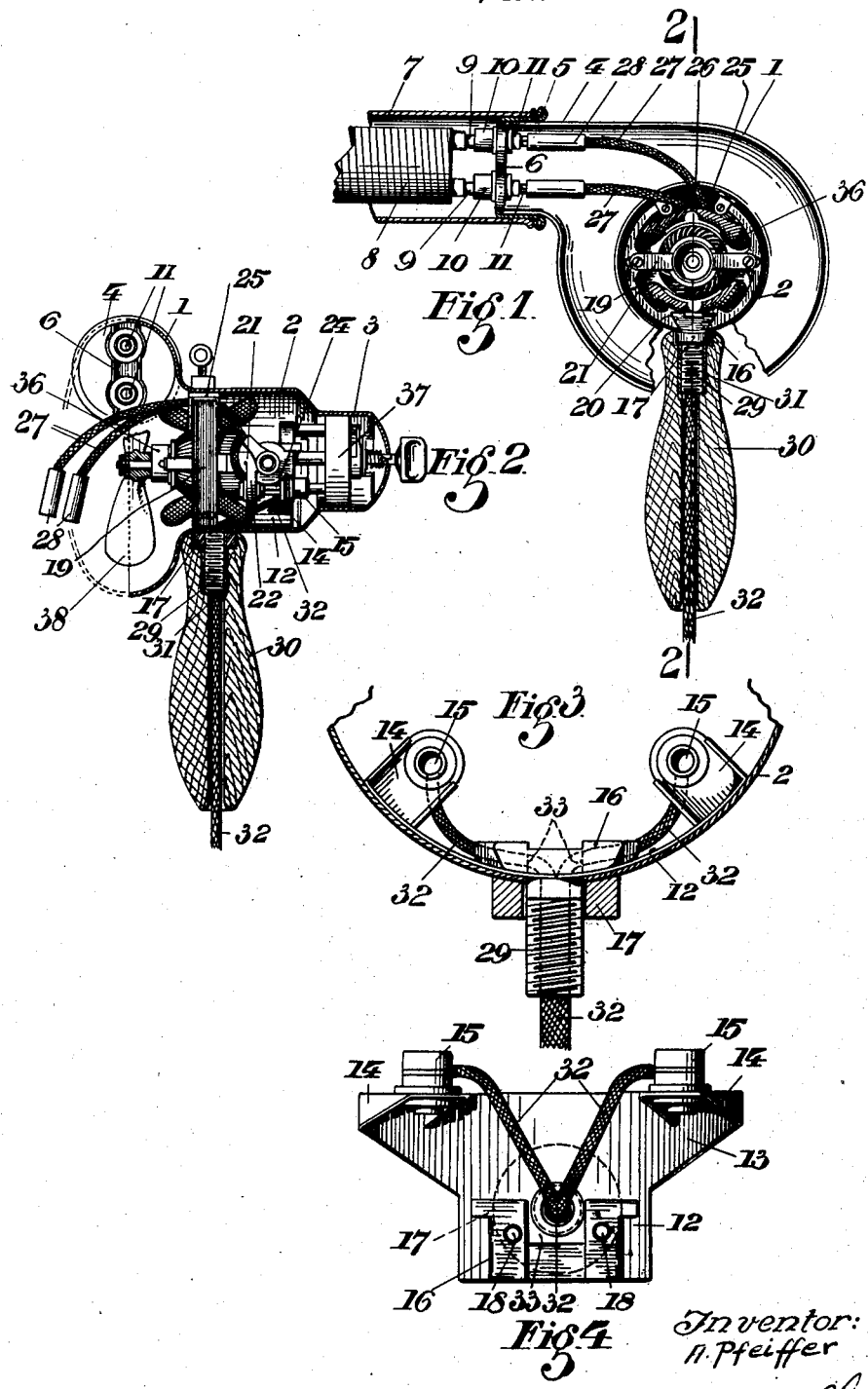
Inventor:
A. Pfeiffer
By Marks & Clerk
Attorney.

Patented Sept. 4, 1928.

1,683,206

UNITED STATES PATENT OFFICE.

ADOLF PFEIFFER, OF BERLIN, GERMANY, ASSIGNOR TO THE FIRM ELEKTRIZITÄTS-GESELLSCHAFT "SANITAS" M. B. H., OF BERLIN, GERMANY.

SURGICAL MOTOR.

Application filed June 27, 1925, Serial No. 40,070, and in Germany July 8, 1924.

My invention relates to improvements in electric systems for surgical and similar apparatus, such for example as apparatus for producing a current of heated air, vibrators and the like. Apparatus of this type are provided in a casing adapted to be carried by the hand of the operator and including a small electric motor. In apparatus of this type the electrical connections of the leads with the motor, the heating body, the switch and other apparatus cannot easily be made, and the leads are subject to injury when inserting the motor. The object of the improvements is to provide an electric system for apparatus of this type in which the said objections are obviated, and with this object in view the casing and the frame of the motor are provided with cooperating contact members disposed so that when inserting the motor the leads are directly connected with their terminals.

For the purpose of explaining the invention an example embodying the same has been shown in the accompanying drawing, in which the same reference characters have been used in all the views to indicate corresponding parts. In said drawing, Fig. 1, is a sectional elevation showing an electric fan, the removable front portion of the fan casing being removed, Fig. 2, is a sectional elevation taken on the line 2—2 of Fig. 1, Fig. 3, is a partial sectional view on an enlarged scale showing the support for the terminals carried by the motor casing, and Fig. 4, is a top-plan view of the said support.

For the purpose of describing the invention reference will be made to an electric fan of known construction adapted to be carried by the hand of the person using the same, and provided with an electric motor and heating means. But I wish it to be understood that my invention is not limited to the embodiment in an apparatus of this type, and that it may be used in surgical or other apparatus including a small electric motor.

In the example shown in Fig. 1 the apparatus consists of a casing comprising a chamber 1 including a fan 38, a chamber 2 of smaller diameter and including an electric motor 36, and a chamber 3 the diameter of which is further reduced, and which includes a switch 37 mechanically and electrically connected with the motor. The part 1 of the casing is made integral with a tubular delivery portion 4 carrying a hood 5. The body portion of the said hood is formed with openings separated from each other by a bridge portion 6, the said openings permitting the flow of the air from the chamber 1. The hood 5 carries a delivery pipe 7 enclosing an electric heating body 8. At its inner end the heating body is provided with electric plugs 9 engaging in contact sleeves 10 secured to the bridge 6. The sleeves 10 are provided with rear extensions 11 in the form of plugs.

To the inner wall of the portion 2 of the motor casing a sheet metal plate 12 is secured, which is formed at both sides with ears 13 carrying brackets 14. To the said brackets contact sleeves 15 are secured the axes of which are parallel to the axis of the motor casing. On the front end of the said plate there is a guide member 16 in the form of a dovetail. On the outer wall of the portion 2 of the casing and at the part thereof adjacent to the plate 12 there is a cylindrical body 17 fitting on the outer wall of the casing. Screws 18 passed through the body 17, bores of the wall of the casing, the plate 12 and into the guide members 16 hold the parts 16 and 17 in clamping engagement with the plate 12 and the wall of the casing 2.

The stator 19 of the motor 36 is formed at its bottom with a recess 20 corresponding to the guide way 16. Further, the frame 21 of the motor is provided with eyes or lugs 22 carrying each a contact plug 24, which plugs are in position for engaging in the contact sleeves 15 when placing the stator on the guide way 16, the plugs being completely inserted into the said sleeves by completely shifting the motor into the casing. Therefore the guide way 16 has the function, first to fix the motor within the casing, and second to insure the proper engagement of the plugs 24 in the sleeves 15. From the plugs 24 the current is distributed to the motor, the switch, and the heating coil. For supplying current to the heating coil two leads 27 are provided, which are passed through a peripheral recess 26 in the iron body of the stator and closed at the periphery by a plate 25. At their ends the said leads carry contact sleeves 28 corresponding to the plugs 11 of the heating coil.

To the plate 12 a tubular member 29 having external screw-threads is secured, which member passes through holes made respectively in the wall of the casing 2 and the body 17. To the said member a handle 30 is secured, which, as shown, is provided with an internally screw-threaded bushing 31 screwing on the member 29. The handle is provided with an axial bore in alignment with the bore of the member 29 and receiving the leads 32 for supplying current to the electric system, the said leads being passed through a recess 33 of the guide way 16 and being connected to the sleeves 15. This connection can readily be made while the sleeves 15 are outside the casing and before fixing the plate 12 in position within the casing.

I wish it to be understood that my invention is not limited to the construction of the contact members shown in the drawing and that in some cases I provide contacts in the form of blades, slide contacts, spring pressed contact members, etc.

In the example shown in the figures the eyes or lugs 22 are made integral with the frame 21. But I do not limit myself to this construction, and in some cases I provide the said eyes on a yoke screwed or otherwise secured to the frame 21.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. The combination, with a casing, an electromotor mounted therein, a supporting plate fixed to the inner wall of said casing and having inwardly projecting lugs, and sleeves and plugs provided respectively on said lugs and motor, said sleeves and plugs opposing each other in the direction of insertion of the motor so as to make direct contact with each other when inserting the motor.

2. The combination, with a casing, a supporting member fixed internally to the wall thereof forming a longitudinal guide, an electromotor mounted on said member and having a longitudinal slot receiving said member, and terminals provided respectively on said member and motor, said terminals on the motor and member opposing each other in the direction of insertion of the motor so as to make direct contact with each other when inserting the motor.

3. The combination, with a casing, a supporting member in the form of a dovetail fixed internally to the wall thereof, an electromotor mounted on said member, and terminals provided respectively on said member and motor, said terminals on the motor and member opposing each other in the direction of insertion of the motor so as to make direct contact with each other when inserting the motor.

4. The combination, with a casing, a supporting member in the form of a dovetail fixed internally to the wall thereof, an electromotor having a recess in the form of a dovetail engaging the dovetail of said support, and terminals provided respectively on said member and motor, said terminals on the motor and member opposing each other in the direction of insertion of the motor so as to make direct contact with each other when inserting the motor.

5. The combination, with a casing, an electromotor mounted therein, a supporting plate mounted on the inner wall of said casing, a block provided on the outer face of the casing at the part thereof adjacent to said plate, screws passsed through said block and the wall of said casing and said plate for clamping said parts together, and terminals provided respectively on said plate and motor, said terminals on the motor and plate opposing each other in the direction of insertion of the motor so as to make direct contact with each other when inserting the motor.

6. The combination, with a casing, an electromotor mounted therein, plug and sleeve contacts provided respectively on said casing and motor, and means guiding the motor in its insertion movement in such manner that during this movement the plugs and sleeves are positively held in coaxial alinement with each other.

7. The combination with a casing, of a supporting member forming a longitudinal guide fixed internally to the wall of said casing, an electromotor mounted on said member and having a longitudinal slot receiving said member.

8. The combination with a casing, of a supporting member in the form of a dovetail fixed internally to the wall of said casing, and an electromotor having a recess in the form of a dovetail engaging the dovetail of said support.

9. The combination with a casing, of an electromotor mounted therein, a supporting member for said motor mounted on the inner wall of said casing, a block provided on the outer face of the casing in opposition to said supporting member and means for clamping together said supporting member, casing wall and block.

In testimony whereof I affix my signature.

ADOLF PFEIFFER.